(12) United States Patent
Inoue et al.

(10) Patent No.: US 7,187,782 B2
(45) Date of Patent: Mar. 6, 2007

(54) DIGITAL WATERMARK-EMBEDDING APPARATUS, DIGITAL WATERMARK-EMBEDDING METHOD, AND RECORDING MEDIUM HAVING RECODED THEREIN A PROGRAM FOR PERFORMING THE DIGITAL WATERMARK-EMBEDDING METHOD

(75) Inventors: Hisashi Inoue, Fukuoka (JP); Kenichi Noridomi, Fukuoka (JP); Takashi Katsura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 845 days.

(21) Appl. No.: 10/392,192

(22) Filed: Mar. 20, 2003

(65) Prior Publication Data

US 2003/0179905 A1   Sep. 25, 2003

(30) Foreign Application Priority Data

Mar. 20, 2002   (JP) .............................. 2002-078370

(51) Int. Cl.
  *G06K 9/00* (2006.01)
  *G06K 9/36* (2006.01)
  *G06K 9/46* (2006.01)

(52) U.S. Cl. ....................... 382/100; 382/166; 382/232

(58) Field of Classification Search ................ 382/100, 382/166, 195, 232; 380/205–207; 386/94
See application file for complete search history.

(56) References Cited

U.S. PATENT DOCUMENTS

| 5,396,567 | A  | * | 3/1995 | Jass .......................... 382/251 |
| 5,809,139 | A  | * | 9/1998 | Girod et al. ................ 380/202 |
| 6,222,932 | B1 | * | 4/2001 | Rao et al. ................... 382/100 |
| 6,229,924 | B1 | * | 5/2001 | Rhoads et al. .............. 382/232 |
| 7,095,870 | B2 | * | 8/2006 | Fukushima et al. ......... 382/100 |

FOREIGN PATENT DOCUMENTS

| JP | 11-346302   | 12/1999 |
| JP | 2001-352441 | 12/2001 |

\* cited by examiner

*Primary Examiner*—Jingge Wu
*Assistant Examiner*—Yubin Hung
(74) *Attorney, Agent, or Firm*—Wenderoth, Lind & Ponack, L.L.P.

(57) ABSTRACT

An input image is divided into local regions, each of which is formed by a macro block. An embedment intensity is determined for each of the local regions by using a calculated characteristic amount and a compression bit rate. Digital watermarks are embedded at the determined embedment intensity into the input image at each of the local regions thereof. The input image is encoded, thereby providing a compressed bit stream that has the digital watermarks embedded therein.

10 Claims, 3 Drawing Sheets

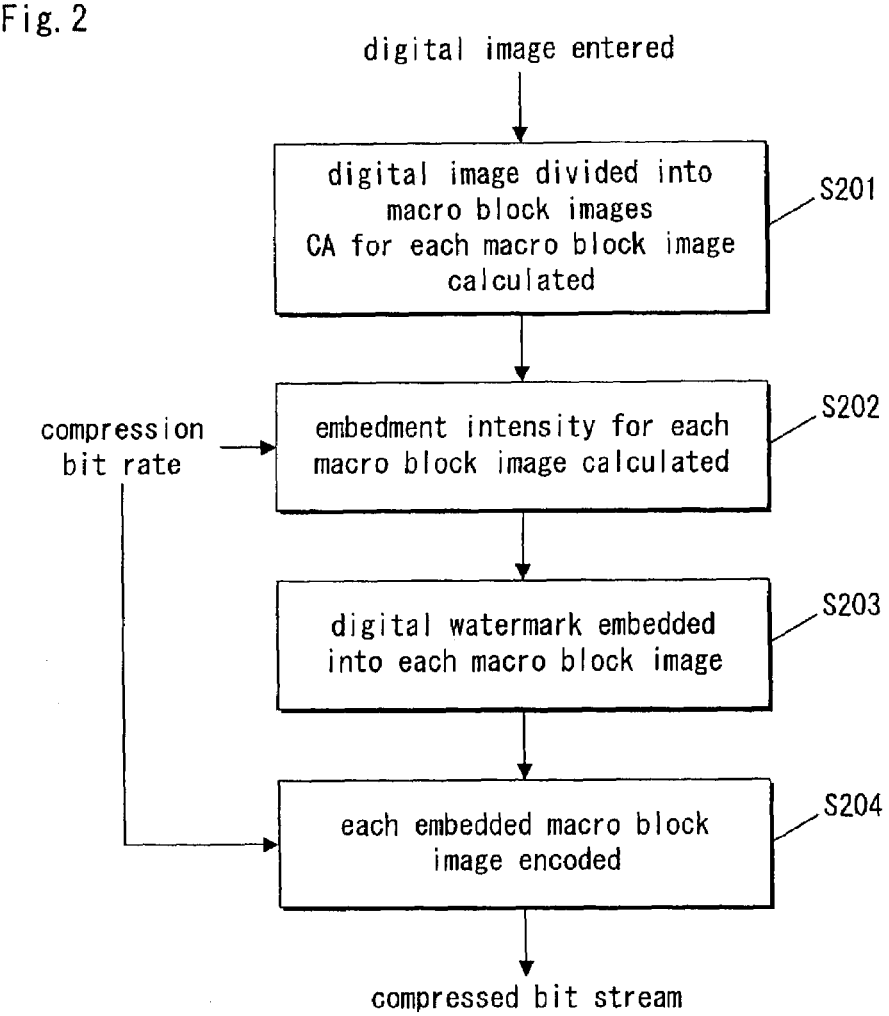

DIGITAL WATERMARK-EMBEDDING APPARATUS, DIGITAL WATERMARK-EMBEDDING METHOD, AND RECORDING MEDIUM HAVING RECODED THEREIN A PROGRAM FOR PERFORMING THE DIGITAL WATERMARK-EMBEDDING METHOD

BACKGROUND OF THE INVENTION

1. Field of the Invention

The present invention relates to a digital watermark-embedding apparatus, a digital watermark-embedding method, and a medium having recorded therein a program for practicing the digital watermark-embedding method. In particular, the present invention relates to a method for regulating the intensity that is required to embed digital watermarks into a digital image.

2. Description of the Related Art

With digital content such as digitized audio and digitized video data, it is easy to provide a faithful reproduction of original content. Therefore, it is a recent issue of importance to protect the copyright of the digital content. A "digital watermark" is used as one solution to the issue.

The digital watermark is an art of embedding data into video data in such a manner as to prevent human beings from perceiving degradation in image quality, and of detecting the embedded data from such image data.

The digital watermarks embedded in the image data must properly be detected from pictures that have been subjected to image processing such as image compression and noise addition. A degree to which the digital watermarks withstand such detection after the image processing is herein called toughness-with-image-processing.

The image quality degradation and the toughness-with-image-processing form a trade-off relationship, and are balanced with one another by adjusting a value of embedment intensity.

For example, an increased value of the embedment intensity enhances the toughness-with-image-processing while increasing degradation in image quality of an image having the digital watermarks embedded therein. Meanwhile, a decreased value of the embedment intensity inhibits the image quality degradation, but reduces the toughness-with-image-processing.

A prior art digital watermark-embedding method designed to automatically regulate such a trade-off relationship has been taught as an illustration in published Japanese Patent Application Laid-Open No. 11-346302. This method is now described in brief.

FIG. 4 is a block diagram illustrating a prior art digital watermark-embedding system. In FIG. 4, a category-classifying unit 401 calculates a characteristic amount of an input image, and then determines, from the calculated characteristic amount, a category under which the image falls. The category-classifying unit 401 feeds a category index to an accumulation apparatus 402.

The accumulation apparatus 402 has a digital watermark characteristic table for each of the category indexes, and selects a proper characteristic table in accordance with the category index sent from the category-classifying unit 401. The digital watermark characteristic table describes a relationship between digital watermark intensity, a degree of degradation in image quality, and an evaluation of toughness with attack (image processing).

A digital watermark intensity-calculating unit 403 feeds the digital watermark intensity into the accumulation apparatus 402, and then calculates an optimum digital watermark intensity using the degree of degradation in image quality, the evaluation of toughness, and constraint information. The degree of degradation in image quality and the evaluation of toughness are fed from the accumulation apparatus 402, while the constraint information is entered from a user. The digital watermark intensity-calculating unit 403 delivers the calculated optimum digital watermark intensity to a digital watermark-embedding unit 404.

The digital watermark-embedding unit 404 converts embedded data into digital watermarks, and then embeds the digital watermarks into the input image at the optimum digital watermark intensity that is fed from the digital watermark intensity-calculating unit 403. As a result, a digital watermark-embedded image is produced.

(1) The prior art employs activity (a squared average value of AC frequency components) of the entire image as a characteristic amount of the input image.

However, the input image is not always uniformly formed. In nearly all of the input images, more diversified, complicated regions and less diversified, simple regions are scattered.

An excess degree of intensity, at which the digital watermarks are embedded into the image, renders digital watermark-caused image quality deterioration more conspicuous. In particular, such deterioration in image quality becomes more pronounced at less diversified regions of the input image.

As a result, the prior art has a problem in that the digital watermarks are often embedded at an improper degree of intensity over local regions of the input image, with a consequential degradation in image quality.

(2) The degree of degradation in image quality according to the prior art is a numeric value calculated in accordance with the input image and the digital watermark-embedded image that is obtained immediately after the digital watermarks are embedded into the image.

Now, assume that video data accumulated and saved in a recoding medium such as a hard disk are transmitted and distributed through a network. In this instance, in order to reduce an amount of data, video data-forming images are encoded in accordance with, e.g., a MPEG system for moving pictures, or otherwise, e.g., a JPEG system for static images.

As a result, a pre-encoded, digital watermark-embedded image usually differs from a post-encoded, digital watermark-embedded image.

For example, in a digital watermark-embedded image that has been compressed according to a low compression bit rate, compression-caused block distortions are noticeably observed. Therefore, such a digital watermark-embedded image is considerably poorer in image quality than a pre-compressed, digital watermark-embedded image.

In short, the prior art takes no account of a change in image quality between pre-compression and post-compression. This causes a further problem in that the digital watermarks cannot be embedded into the input image at a preferable degree of embedment intensity, with a consequentially improper relationship between degradation in image quality and the toughness-with-image-processing.

OBJECTS AND SUMMARY OF THE INVENTION

A first object of the present invention is to provide an art of inhibiting degradation in image quality.

A second object of the present invention is to provide an art of embedding digital watermarks into an input image at a proper degree of embedment intensity when the image is compressed.

A first aspect of the present invention provides a digital watermark-embedding apparatus comprising: a characteristic amount-calculating unit operable to calculate a characteristic amount of a digital image; an embedment intensity-determining unit operable to determine embedment intensity by using the characteristic amount calculated by the characteristic amount-calculating unit and a compression bit rate for use in encoding; a digital watermark-embedding unit operable to embed a digital watermark into the digital image at the embedment intensity determined by the embedment intensity-determining unit; and an image-encoding unit operable to encode, by using the compression bit rate, the digital image having the digital watermark embedded therein by the digital watermark-embedding unit, thereby providing a compressed bit stream.

This construction allows the intensity of the digital watermarks to be determined on the basis of the compression bit rate for use in encoding and the characteristic amount of the input image. More specifically, the digital watermark-embedding intensity can be determined in view of image quality of a post-image encoded, digital watermark-embedded image, and the digital watermarks can be embedded into the digital image in accordance with a degree of compression.

A second aspect of the present invention provides a digital watermark-embedding apparatus as defined in the first aspect of the present invention, wherein the characteristic amount-calculating unit calculates a characteristic amount for each local region that forms part of the digital image.

This construction calculates a characteristic amount for each of the local regions of the input image. This feature adjusts embedment intensity for each of the local regions, and can inhibit degradation in image quality. More specifically, the digital watermarks are embedded into the input image for each of the local regions thereof at an embedment intensity that is properly adjusted to balance with the characteristic amount. At this time, the digital watermarks are embedded in accordance with a state of each of the local regions of the input image. As a result, image quality degradation can be suppressed, which otherwise would be rendered conspicuous as a result of the embedment of the digital watermarks.

A third aspect of the present invention provides a digital watermark-embedding apparatus as defined in the first aspect of the present invention, wherein the embedment intensity-determining unit employs one of a table having a digital watermark-embedding intensity correlated with a characteristic amount calculated by the characteristic amount-calculating unit, a table having the digital watermark-embedding intensity correlated with a compression bit rate for use in encoding that the image-encoding unit performs, and a table having the digital watermark-embedding intensity correlated with both of the characteristic amount and the compression bit rate.

The use of the table allows the embedment intensity to be adjusted in accordance with the compression bit rate. More specifically, the digital watermarks are embedded into the digital image at an embedment intensity that is properly adjusted in view of an image quality of a post-image encoded, digital watermark-embedded image.

The above and other objects, features and advantages of the present invention will become apparent from the following description when read in conjunction with the accompanying drawings, in which like reference numerals designate the same elements.

BRIEF DESCRIPTION OF THE DRAWINGS

FIG. 2 is an exemplary flowchart illustrating how the digital watermark-embedding apparatus is operated;

FIG. 3(a) is an exemplary illustration showing a table related to a characteristic amount;

FIG. 3(b) is an exemplary illustration showing a table related to a compression bit rate.

DETAILED DESCRIPTION OF THE PREFERRED EMBODIMENT

Figure 1:
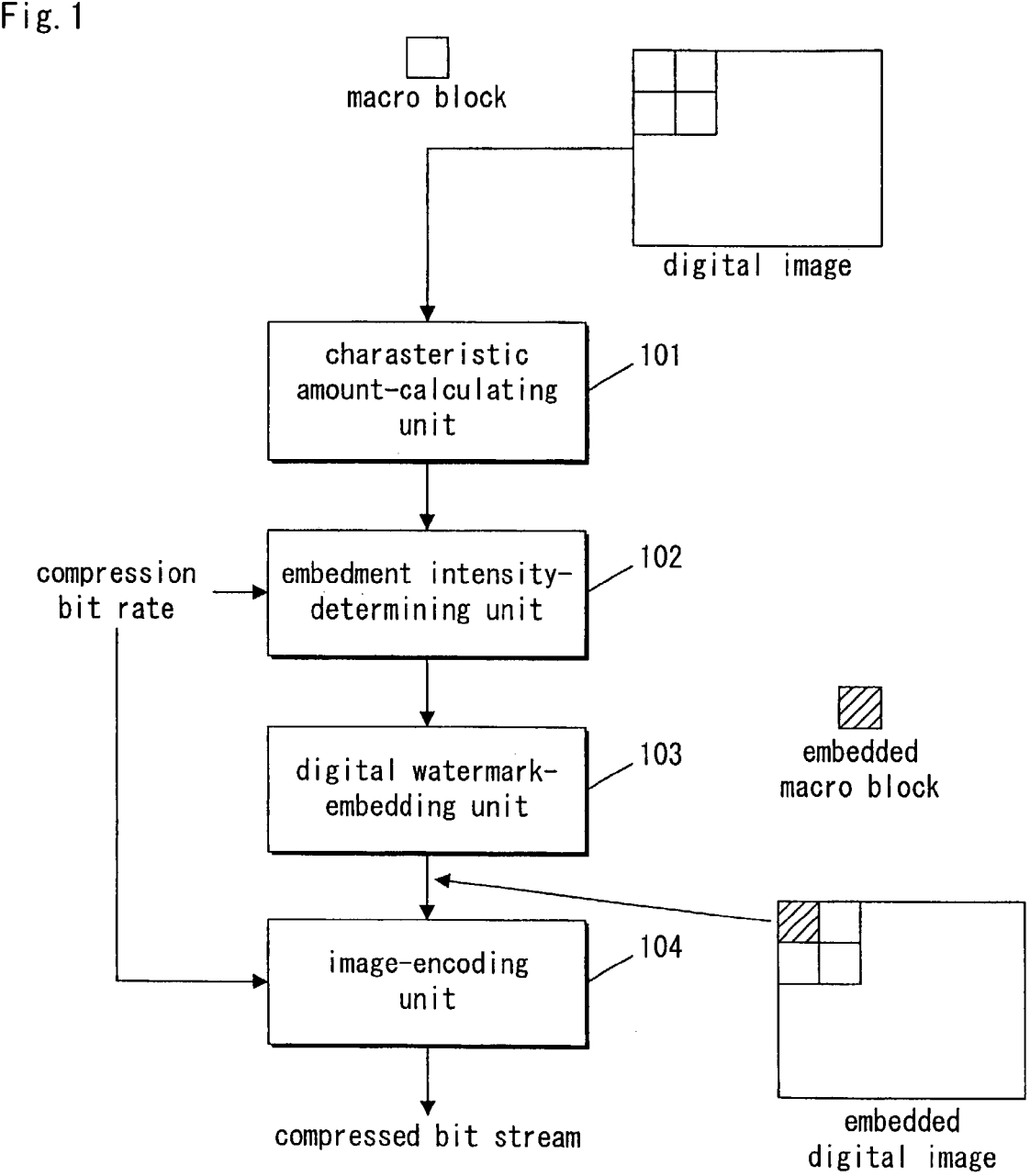
FIG. 1 is a block diagram illustrating an exemplary digital watermark-embedding apparatus according to an embodiment of the present invention.
Figure 4:
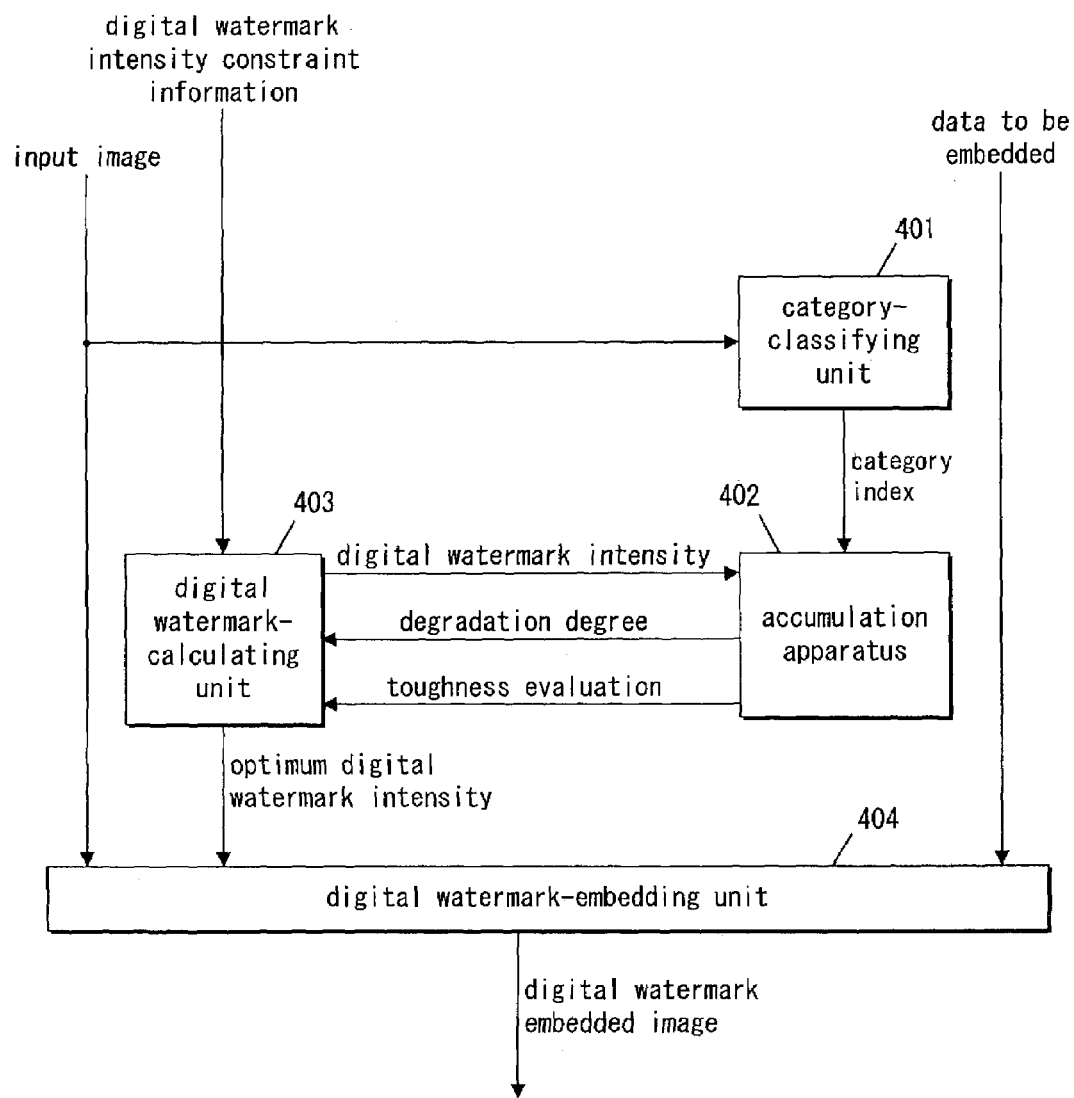
FIG. 4 is a block diagram illustrating a prior art digital watermark-embedding apparatus.

An embodiment of the present invention will now be described with reference to the drawings. FIG. 1 is a block diagram illustrating a construction of an exemplary digital watermark-embedding apparatus according to the present embodiment.

As illustrated in FIG. 1, the digital watermark-embedding apparatus includes a characteristic amount-calculating unit 101, an embedment intensity-determining unit 102, a digital watermark-embedding unit 103, and an image-encoding unit 104. The image-encoding unit 104 according to the present embodiment corresponds to a processing unit for performing predetermined signal processing of a digital image having digital watermarks embedded therein.

The following discusses with reference to FIGS. 2 and 3 the way in which the digital watermarks are embedded. FIG. 2 is an exemplary flowchart illustrating how the digital watermarks-embedding apparatus is operated.

At step S201, the characteristic amount-calculating unit 101 divides an entered digital image into a plurality of localized regional images that are predefined on a pixel-by-pixel basis. As a result, a characteristic amount is calculated for each local region.

The local region according to the present embodiment is a macro block that consists of sixteen pixels-by-sixteen pixels. According to the present embodiment, a characteristic amount for each of the local regions is an average value of luminance components.

Alternatively, the local region defined as a single macro block as just discussed may be a plurality of macro blocks that form a line, or otherwise may be each object or anything processable according to image encoding.

The local region defined by a plurality of line-forming macro blocks provides a reduced calculation amount, when compared with the local region defined by the single macro block. Accordingly, this alternative is useful in case of insufficient system resources.

The characteristic amount defined as an average value of luminance components may alternatively be a sum of differential absolute values of horizontally and vertically neighboring pixels. When the local region consists of sixteen pixels-by-sixteen pixels, and when each of the pixels has luminance data of d (i, j) ($0 \leq i \leq 15$, $o \leq j \leq 15$), then a sum "Sh" of differential absolute values of horizontally neighboring pixels is defined by the following expression:

$$Sh = \sum_{i=0}^{15} \sum_{j=0}^{14} |d(i, j) - d(i, j+1)| \quad \text{[EX 1]}$$

A sum "Sv" of differential absolute values of vertically neighboring pixesl is defined by the following expression:

$$Sv = \sum_{i=0}^{14} \sum_{j=0}^{15} |d(i, j) - d(i+1, j)| \quad \text{[EX 2]}$$

A calculated characteristic amount according to visual characteristics of human eyes renders image quality degradation less perceptible. This feature aids in increasing embedment intensity. The various characteristic amounts as described above are offered merely for purposes of illustration, and the present invention may encompass the use of other characteristic amounts.

The following discusses with reference to FIG. 3 the way in which the embedment intensity-determining unit 102 practices processing at step 202. Table 1 as illustrated in FIG. 3(a) shows a correlation between a characteristic amount and embedment intensity. Table 2 as illustrated in FIG. 3(b) shows a correlation between a compression bit rate and the embedment intensity.

Table 1 is used to compare the characteristic amount calculated by the characteristic amount-calculating unit 101 with predetermined threshold values Y1, Y2 (Y2<Y1). "intensity 1" is determined according to such a range of the characteristic amount. For example, assuming that the characteristic amount is greater than threshold value Y1, then "3" is outputted as "intensity 1".

Table 2 is used to compare the compression bit rate employed by the image-encoding unit 104 with predetermined threshold values B1, B2 (B2<B1). "intensity 2" is determined according to such a range of the compression bit rate. For example, assuming that the compression bit rate is smaller than threshold value B2, then "3" is outputted as "intensity 2".

The embodiment intensity-determining unit 102 adds "intensity 1" to "intensity 2", thereby feeding a sum of them as an embedment intensity into the digital watermark-embedding unit 103. The embedment intensity according the present embodiment is 6(=3+3).

Although a sum of "intensity 1" and "intensity 2" is the embedment intensity to be fed into the digital watermark-embedding unit 103, the present invention is not limited thereto. For example, a product of "intensity 1" and "intensity 2" may be conveyed as an alternative embedment intensity to the digital watermark-embedding unit 103.

At step S203, the digital watermark-embedding unit 103 embeds digital watermarks into the image at the local regions thereof (i.e., macro blocks according to the present embodiment) at the embedment intensity determined by the embedment intensity-determining unit 102. The digital watermark-embedding unit 103 sends the image having the digital watermarks embedded therein at the local regions thereof to the image-encoding unit 104.

In this way, a series of processing at the characteristic amount-calculating unit 101, the digital watermark-embedding unit 103, and the image-encoding unit 104 is executed in a parallel manner for each of the macro blocks. This feature provides less waiting time and more efficient processing.

At step S204, the image-encoding unit 104 encodes the digital watermark-embedded image in accordance with a predetermined compression bit rate, thereby producing a compressed bit stream.

As described above in detail, the digital watermark-embedding apparatus according to the present embodiment divides a digital image into a plurality of local regions that are predefined on a pixel-by-pixel basis, and then calculates a characteristic amount for each of the local regions. The digital watermark-embedding apparatus determines an embedment intensity by using one table having the embedment intensity correlated with characteristic amounts and another table having the embedment intensity correlated with predetermined compression bit rates.

The above system calculates a characteristic amount for each small region of an input image. This feature makes it feasible to adjust the embedment intensity for each of the regions, thereby suppressing degradation in image quality. The above system adjusts the embedment intensity in accordance with the compression bit rate. This feature makes it feasible to determine the embedment intensity in view of the image quality of a post-image encoded, digital watermark-embedded image.

Typically, the digital watermark-embedding apparatus according to the present embodiment realizes functions by using a storage unit (a ROM, a RAM, and a hard disk), which contains predetermined program data, and a CPU (central processing unit) for performing the predetermined program data. The program data may be introduced through a recoding medium such as a CD-ROM and a floppy disk.

According to the present invention, a characteristic amount is calculated for each small region of an input image. As a result, the embedment intensity is adjustable for each of the regions, and degradation in image quality can be inhibited. In addition, the embedment intensity is adjusted in accordance with a table that has the embedment intensity correlated with the compression bit rate. As a result, the embedment intensity can be determined in view of image quality of a post-image encoded, digital watermark-embedded image.

The above features provide improved toughness with standard image encoding such as MPEG. For example, when a digital watermark-embedded image is compressed according to a low compression bit rate (high compression and low image quality), increased embedment intensity provides improved toughness with compression. Furthermore, image quality degradation such as compression-caused block distortions is more perceivable than embedment-caused image quality degradation, and the embedment-caused image quality degradation can be suppressed independently of increased embedment intensity.

Conversely, when the digital watermark-embedded image is compressed according to a high-compressed bit rate (low compression and high-image quality), decreased embedment intensity can suppress the embedment-caused image quality degradation. In addition, compression-caused degradation is small, and the toughness with compression can be retained, even with a reduction in embedment intensity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital watermark-embedding apparatus comprising:
a characteristic amount-calculating unit operable to calculate a characteristic amount of a digital image;
an embedment intensity-determining unit operable to determine an embedment intensity using the characteristic amount calculated by said characteristic amount-calculating unit and a compression bit rate for use in encoding;
a digital watermark-embedding unit operable to embed a digital watermark into the digital image at the embedment intensity determined by said embedment intensity-determining unit; and
an image-encoding unit operable to encode, by using the compression bit rate, the digital image having the digital watermark embedded therein by said digital watermark-embedding unit, so as to provide a compressed bit stream, wherein:
said characteristic amount-calculating unit is operable to calculate a characteristic amount for each local region, respectively, that forms part of the digital image; and
the characteristic amount for each local region is a sum of an average value of luminance components over the local region and differential absolute values of horizontally neighboring pixels and differential absolute values of vertically neighboring pixels over the same local region.

2. A digital watermark-embedding apparatus as defined in claim 1, wherein each local region is one or a plurality of macro blocks for use in encoding performed by said image-encoding unit.

3. A digital watermark-embedding apparatus as defined in claim 1, wherein said embedment intensity-determining unit is operable to employ one of a table having a digital watermark-embedding intensity correlated with a characteristic amount calculated by said characteristic amount-calculating unit, a table having the digital watermark-embedding intensity correlated with the compression bit rate for use in encoding performed by said image-encoding unit, and a table having the digital watermark-embedding intensity correlated with both of the characteristic amount and the compression bit rate.

4. A digital watermark-embedding apparatus as defined in claim 3, wherein the table is set to permit the digital watermark to be embedded at a reduced intensity when the compression bit rate is increased, but to allow the digital watermark to be embedded at an increased intensity when the compression bit rate is reduced.

5. A digital watermark-embedding apparatus as defined in claim 1, wherein said digital watermark-embedding unit is operable to embed the digital watermark into the digital image usually at different values of an embedment intensity for each local region that forms part of the digital image.

6. A digital watermark-embedding method comprising:
calculating a characteristic amount of a digital image;
determining an embedment intensity using the calculated characteristic amount and a compression bit rate for use in encoding;
embedding a digital watermark into the digital image at the determined embedment intensity; and
encoding, by using the compression bit rate, the digital image having the digital watermark embedded therein, so as to provide a compressed bit stream, wherein:
said calculating of the characteristic amount comprises calculating a characteristic amount for each local region, respectively, that forms part of the digital image; and
the characteristic amount for each local region is a sum of an average value of luminance components over the local region and differential absolute values of horizontally neighboring pixels and differential absolute values of vertically neighboring pixels over the same local region.

7. A digital watermark-embedding method as defined in claim 6, wherein each local region is one or a plurality of macro blocks for use in the encoding.

8. A digital watermark-embedding method as defined in claim 6, wherein one of a table having a digital watermark-embedding intensity correlated with the calculated characteristic amount, a table having the digital watermark-embedding intensity correlated with the compression bit rate for use in the encoding, and a table having the digital watermark-embedding intensity correlated with both of the calculated characteristic amount and the compression bit rate is employed.

9. A digital watermark-embedding method as defined in claim 8, wherein the table is set to permit the digital watermark to be embedded at a reduced intensity when the compression bit rate is increased, but to allow the digital watermark to be embedded at an increased intensity when the compression bit rate is reduced.

10. A digital watermark-embedding method as defined in claim 6, wherein the digital watermark is embedded into the digital image usually at different values of an embedment intensity for each local region that forms part of the digital image.

* * * * *